US012743092B2

(12) United States Patent
Lee et al.

(10) Patent No.: US 12,743,092 B2
(45) Date of Patent: Sep. 22, 2026

(54) METHOD AND SERVER FOR REMOTELY CONTROLLING VEHICLE

(71) Applicant: SEOUL ROBOTICS CO., LTD., Seoul (KR)

(72) Inventors: Hanbin Lee, Seoul (KR); Jaeil Park, Seoul (KR); Hong Minh Truong, Suwon-si (KR); Oran Kwon, Seoul (KR)

(73) Assignee: Seoul Robotics Co., Ltd., Seoul (KR)

( * ) Notice: Subject to any disclaimer, the term of this patent is extended or adjusted under 35 U.S.C. 154(b) by 149 days.

(21) Appl. No.: 18/756,306

(22) Filed: Jun. 27, 2024

(65) Prior Publication Data

US 2024/0353851 A1 Oct. 24, 2024

Related U.S. Application Data

(63) Continuation of application No. PCT/KR2022/021704, filed on Dec. 30, 2022.

(30) Foreign Application Priority Data

Dec. 31, 2021 (KR) ........................ 10-2021-0194473

(51) Int. Cl.
*G05D 1/22* (2024.01)
*G05D 1/225* (2024.01)
(Continued)

(52) U.S. Cl.
CPC ............. *G05D 1/225* (2024.01); *G05D 1/249* (2024.01); *G05D 1/633* (2024.01); *G05D 1/6987* (2024.01);
(Continued)

(58) Field of Classification Search
CPC ........ G05D 1/225; G05D 1/249; G05D 1/633; G05D 2105/20; G05D 2107/13;
(Continued)

(56) References Cited

U.S. PATENT DOCUMENTS 6,032,097 A * 2/2000 Lihoshi ................ G05D 1/0293 340/436
2002/0044049 A1 4/2002 Saito et al.
(Continued)

FOREIGN PATENT DOCUMENTS

JP 2002-123881 A 4/2020
JP 2020-080142 A 5/2020
(Continued)

OTHER PUBLICATIONS

Extended European Search Report in EP Application No. 22916834.9 dated Nov. 24, 2025.
(Continued)

*Primary Examiner* — Rodney A Butler
(74) *Attorney, Agent, or Firm* — Knobbe, Martens, Olson & Bear, LLP

(57) ABSTRACT

Proposed is a server for remotely controlling a vehicle configured to establish a session for remote control of a vehicle to be transported. The server may receive sensing data from a plurality of sensing devices installed in a certain area, and track spaces corresponding to the certain area, based on the received sensing data. The server may also obtain vehicle control information according to a location of the vehicle to be transported, based on object information related to objects in the tracked spaces and vehicle information about the vehicle to be transported. The server may further transmit the obtained vehicle control information to the vehicle to be transported.

18 Claims, 8 Drawing Sheets

(51) Int. Cl.

| | |
|---|---|
| ***G05D 1/24*** | (2024.01) |
| ***G05D 1/249*** | (2024.01) |
| ***G05D 1/633*** | (2024.01) |
| ***G05D 1/69*** | (2024.01) |
| ***G05D 1/698*** | (2024.01) |
| ***G08G 1/01*** | (2006.01) |
| ***G08G 1/09*** | (2006.01) |
| ***G08G 1/0968*** | (2006.01) |
| ***G08G 1/16*** | (2006.01) |
| *G05D 105/20* | (2024.01) |
| *G05D 107/13* | (2024.01) |
| *G05D 109/10* | (2024.01) |

(52) U.S. Cl.
CPC ......... *G08G 1/0116* (2013.01); *G08G 1/0133* (2013.01); *G08G 1/0145* (2013.01); *G08G 1/096822* (2013.01); *G08G 1/164* (2013.01); *G05D 2105/20* (2024.01); *G05D 2107/13* (2024.01); *G05D 2109/10* (2024.01)

(58) Field of Classification Search
CPC ............. G05D 2109/10; G05D 1/6987; G05D 1/0011; G05D 1/0212; G05D 1/0231; G05D 1/0268; G08G 1/0116; G08G 1/0133; G08G 1/0145; G08G 1/04; G08G 1/096822; G08G 1/164
See application file for complete search history.

(56) References Cited

U.S. PATENT DOCUMENTS

| | | | |
|---|---|---|---|
| 2017/0351267 | A1 | 12/2017 | Mielenz |
| 2018/0307245 | A1 | 10/2018 | Khawaja et al. |
| 2020/0148196 | A1 | 5/2020 | Lim |
| 2020/0218276 | A1 | 7/2020 | Lee et al. |
| 2021/0073539 | A1 | 3/2021 | Wu |
| 2021/0110714 | A1 | 4/2021 | Maruiwa |
| 2021/0118294 | A1 | 4/2021 | Ran et al. |

FOREIGN PATENT DOCUMENTS

| | | | |
|---|---|---|---|
| JP | 2021-512425 | A | 5/2021 |
| JP | 2022-518369 | A | 3/2022 |
| KR | 10-2003-0018461 | A | 3/2003 |
| KR | 10-2003-0072874 | A | 9/2003 |
| KR | 10-2112684 | B1 | 6/2020 |
| WO | WO 2020/241989 | A1 | 12/2020 |

OTHER PUBLICATIONS

Office Action received in Japanese Application No. 2024-539331 dated Jul. 1, 2025.

International Search Report and Written Opinion mailed Mar. 30, 2023 in International Application No. PCT/KR2022/021704, in 7 pages.

Office Action received in Korean Application No. 10-2021-0194473 dated Feb. 3, 2024.

* cited by examiner

METHOD AND SERVER FOR REMOTELY CONTROLLING VEHICLE

CROSS REFERENCE TO RELATED APPLICATIONS

This is a continuation application of International Patent Application No. PCT/KR2022/021704, filed on Dec. 30, 2022, which claims priority to Korean patent application No. 10-2021-0194473 filed on Dec. 31, 2021, contents of each of which are incorporated herein by reference in their entireties.

BACKGROUND

Technical Field

The present disclosure relates to a method and server for remotely controlling a vehicle.

Description of Related Technology

With the fourth industrial revolution, interest in technical fields, such as autonomous vehicles, drones, robots, etc., has increased.

SUMMARY

The present disclosure provides a method and server for tracking a space and remotely controlling a vehicle to be transported, based on sensing data received from sensing devices installed in a certain area. Vehicles may be remotely controlled based on the sensing data received from the sensing devices installed in the certain area without installing expensive sensors for driving in the vehicles.

According to a first aspect, a method of remotely controlling a vehicle includes establishing a session for remote control of a vehicle to be transported, receiving sensing data from a plurality of sensing devices installed in a certain area, tracking spaces corresponding to the certain area, based on the received sensing data, obtaining vehicle control information according to a location of the vehicle to be transported, based on object information related to objects in the tracked spaces and vehicle information about the vehicle to be transported, and transmitting the obtained vehicle control information to the vehicle to be transported.

According to a second aspect, a computer program stored in a storage medium causes a device for remotely controlling a vehicle to perform a method of remotely controlling a vehicle including establishing a session for remote control of a vehicle to be transported, receiving sensing data from a plurality of sensing devices installed in a certain area, tracking spaces corresponding to the certain area, based on the received sensing data, obtaining vehicle control information according to a location of the vehicle to be transported, based on object information related to objects in the tracked spaces and vehicle information about the vehicle to be transported, and transmitting the obtained vehicle control information to the vehicle to be transported.

A server for remotely controlling a vehicle according to a third aspect includes a communication interface unit, a memory storing instructions, and a processor configured to execute the instructions to establish a session for remote control of the vehicle to be transported, receive, through the communication interface unit, sensing data from a plurality of sensing devices installed in a certain area, track spaces corresponding to the certain area, based on the received sensing data, obtain vehicle control information according to a location of the vehicle to be transported, based on object information related to objects in the tracked spaces and vehicle information about the vehicle to be transported, and transmit, through the communication interface unit, the obtained vehicle control information to the vehicle to be transported.

DETAILED DESCRIPTION

In order to control the operation of autonomous vehicles, drones, robots, etc., studies on methods of utilizing various types of sensors have been conducted.

However, it is expensive to mount high-performance sensors on a vehicle in order to reach level-5 autonomous driving, and implementing level-5 autonomous driving with only sensors mounted on an individual vehicle is still not satisfactory in terms of stability.

Hereinafter, various embodiments will be described in detail with reference to the drawings. In order to more clearly describe the characteristics of the embodiments, detailed description of matters widely known to those of skill in the art to which the following embodiments belong will be omitted.

In addition, throughout the present specification, when a component is referred to as being “connected to” another component, it may be “directly connected to” the other component or may be “connected to” the other component through an intervening component. Furthermore, when a component is referred to as “including” another components, the component may additionally include other components rather than excluding other components as long as there is no particular opposing recitation.

In addition, although the terms such as ‘first’ or ‘second’ may be used herein to describe various components, these components should not be limited by these terms. These terms are only used to distinguish one component from another component.

The present embodiments relate to a method and server for remotely controlling a vehicle, and detailed descriptions of matters widely known to those of skill in the art to which the following embodiments belong will be omitted.

Figure 1:
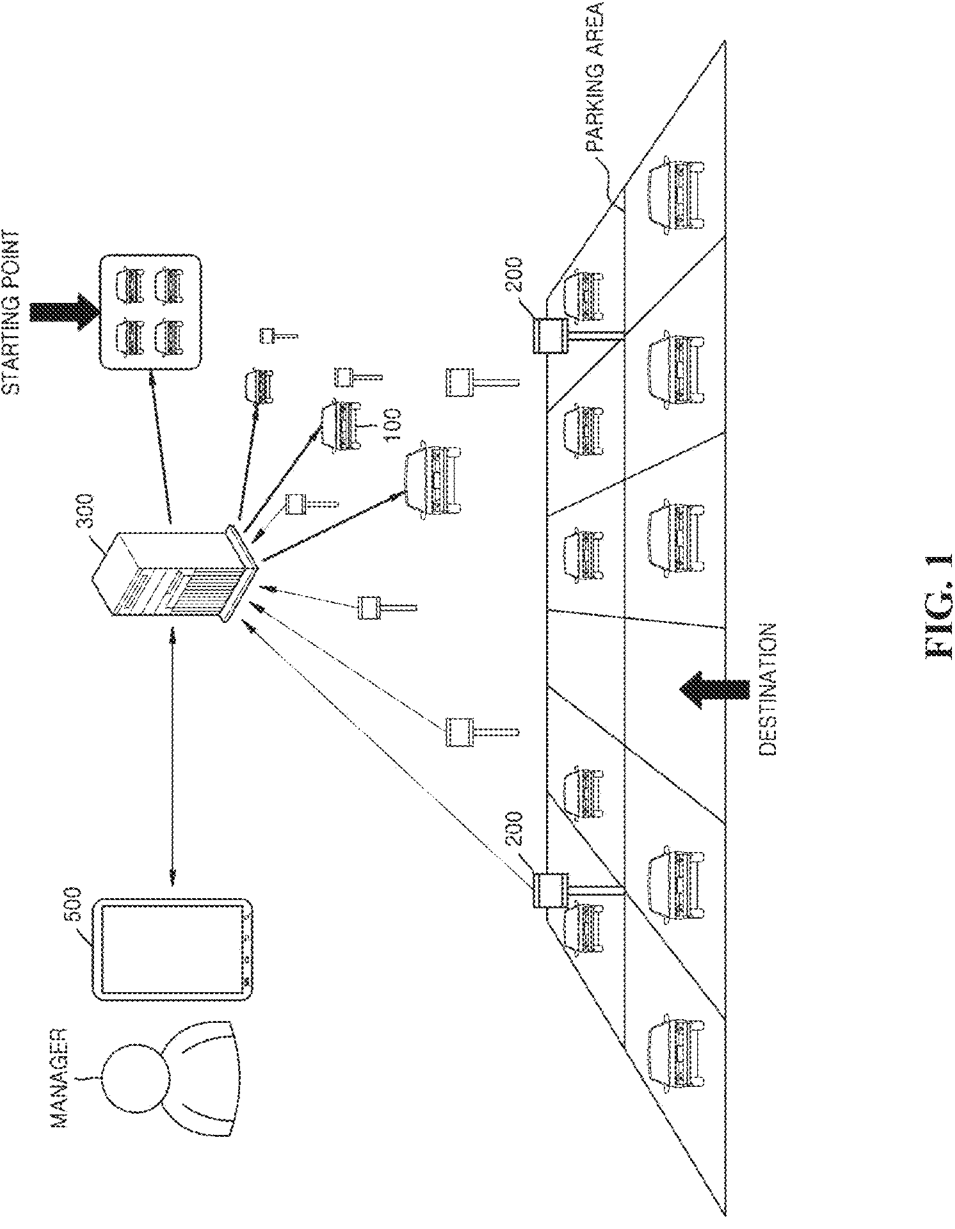
FIG. 1 is a diagram for describing an infrastructure environment in which a vehicle is remotely controlled.

FIG. 1 is a diagram for describing an infrastructure environment in which a vehicle 100 is remotely controlled.

Referring to FIG. 1, it may be seen that the vehicle 100 moves from a starting point to a destination within a certain area in which a plurality of sensing devices 200 are installed.

To this end, a server 300 may receive sensing data from the plurality of sensing devices 200, transmit vehicle control information to the vehicles 100, and remotely control the vehicles 100 to be transported. The vehicle 100 to be transported may be a vehicle 100 that is being transported or is waiting for transport.

The vehicle 100 may be a driving object, such as a car running on a road or a track. However, the meaning of the vehicle 100 may be extended to a term representing aircrafts such as drones or airplanes in a case in which the vehicle 100 is operating in the air rather than on a road or a track, or to a term representing watercrafts such as boats or ships in a case in which the vehicle 100 is operating in the water. Hereinafter, for convenience of description, it is assumed that the vehicle 100 is a car.

In the present specification, the vehicle 100 may be connected to a network with the server 300 such that the vehicle 100 may drive through remote control, and the vehicle 100 may drive based on vehicle control information transmitted remotely, without any manipulation by a person. In the present specification, the vehicle 100 is not assumed to be an autonomous vehicle, and thus, a separate sensor for autonomous driving does not have to be mounted on the vehicle 100. That is, because the vehicle 100 does not have to be an autonomous vehicle, there is no need for the vehicle 100 to detect and track a space while driving through remote control without a crew.

The vehicle control information may include a plurality of commands for controlling operations of a steering device and acceleration/deceleration devices for driving the vehicle 100 to be transported. For example, the vehicle control information may be, but is not limited to, numerical information about the direction of the steering device and the speed, acceleration, deceleration, and the like of the acceleration/deceleration devices, or may correction value information for previous vehicle control information.

The sensing device 200 is a device capable of obtaining sensing data by scanning the surrounding space, and may include at least one sensor. The sensing devices 200 may be installed in several locations within a certain area, and may be installed on the ground or at a certain height from the ground. The sensing devices 200 may be installed by attaching or fixing them to traffic lights or existing facilities. The sensing device 200 may include at least one of various types of sensors, such as a light detection and ranging (LIDAR) sensor, a radar sensor, a camera sensor, an infrared image sensor, or an ultrasonic sensor. For example, in a case in which the sensing device 200 includes a LIDAR sensor, the sensing data may be point cloud data, and in a case in which the sensing device 200 includes a camera sensor, the sensing data may be image data.

The server 300 may remotely control the vehicle 100. The server 300 may establish a communication with the vehicle 100 and the sensing devices 200 for remote control of the vehicle 100 to be transported. The server 300 may store and manage identification information and location information of each of the plurality of sensing devices 200, and may receive sensing data from the sensing devices 200. The server 300 may store and manage vehicle information including identification information and location information of the vehicle 100 to be transported, and may transmit vehicle control information to the vehicle 100.

The server 300 may include a plurality of servers classified by function, such as a session server for managing a communication connection with an external device, a sensing data processing server, or a vehicle control information generation server. In addition, the server 300 may include a plurality of servers having a hierarchical structure according to their positions and roles. Hereinafter, for convenience of description, such servers are collectively referred to as the server 300, but the server 300 does not mean a single server, and may include at least one server.

In order to transport a plurality of vehicles 100 in a first area (e.g., a parking area at the starting point) to a second area (e.g., a parking area at the destination), the server 300 may receive sensing data from the plurality of sensing devices 200 installed in a certain area including the first area and the second area, and track a space corresponding to the certain area. The server 300 may receive the sensing data from the plurality of sensing devices 200 arranged on the moving path of the vehicle 100 to be transported such that there is no blind spot in the tracked space. The server 300 may transmit, to each of the plurality of vehicles 100, vehicle control information corresponding to the vehicle 100.

Hereinafter, a method, performed by the server 300, of remotely controlling the vehicle 100 to be transported will be described in detail.

Figure 2:
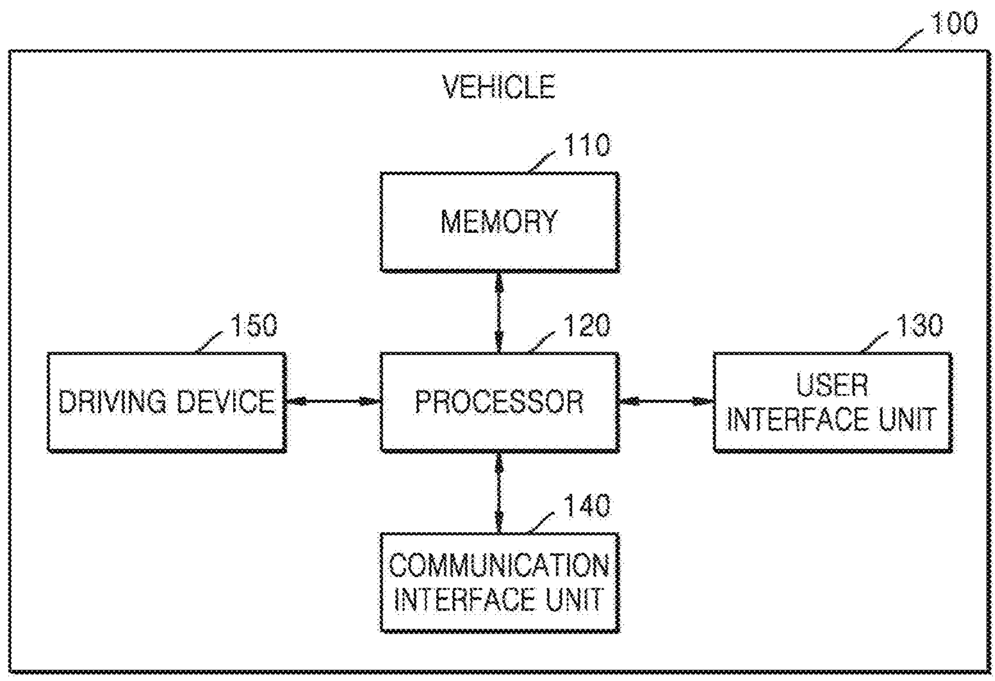
FIG. 2 is a diagram for describing a configuration and operation of a vehicle.

FIG. 2 is a diagram for describing a configuration and operation of the vehicle 100.

Referring to FIG. 2, the vehicle 100 includes a memory 110, a processor 120, a user interface unit 130, a communication interface unit 140, and a driving device 150. Unlike as illustrated in FIG. 2, the vehicle 100 may further include a global positioning system (GPS) device, etc., but those of skill in the art related to the present embodiment may understand that other general-purpose components may be further included in addition to the components illustrated in FIG. 2.

The memory 110 may store software and/or computer programs. The memory 110 may store instructions executable by the processor 120. The processor 120 may access and use data stored in the memory 110 or store new data in the memory 110. The processor 120 may execute the instructions stored in the memory 110. The processor 120 may include at least one processing module. The processing module may be a dedicated processing module for executing a certain program. For example, the processor 120 may include a processing module configured to execute a program that establishes a session for remote control with external devices, or a processing module configured to execute a vehicle control program based on remote control, and may also include the processing modules implemented as separate dedicated chips. The processor 120 may control other components included in the vehicle 100 to perform an operation corresponding to a result of executing an instruction, a computer program, or the like.

The user interface unit 130 may include an input unit for receiving an input from a user, such as a driver or a manager, and an output unit for providing information. The input unit may receive various types of inputs from the user, and the output unit may include a display panel and a controller for controlling the display panel. For example, the user interface unit 130 may be provided in the form of a touch screen in which a display panel and a touch panel are combined with each other.

The communication interface unit 140 may communicate with other devices or the server 300. To this end, the communication interface unit 140 may include a communication module that supports at least one of various communication methods. For example, the communication interface unit 140 may include a communication module configured to perform short-distance communication, such as Wireless Fidelity (Wi-Fi), various types of mobile communication, such as 4th Generation (4G) or 5th Generation (5G), or ultra-wideband communication. The communication interface unit 140 may be connected to the server 300 that remotely controls the vehicle 100, and thus transmit and receive data or information.

The driving device 150 may include a steering device, acceleration/deceleration devices such as an accelerator or a brake, a battery device, a driving motor, a transmission, and the like.

The processor 120 may execute the instructions stored in the memory 110 to perform the following operations. According to an example, the processor 120 may obtain vehicle control information. The processor 120 may obtain data related to the movement and posture of the vehicle based on vehicle control information stored in the memory 120 or vehicle control information received from the server 300, and control the driving of the vehicle 100 by controlling the operation of the steering device or the acceleration/deceleration devices for driving the vehicle 100.

Figure 3:
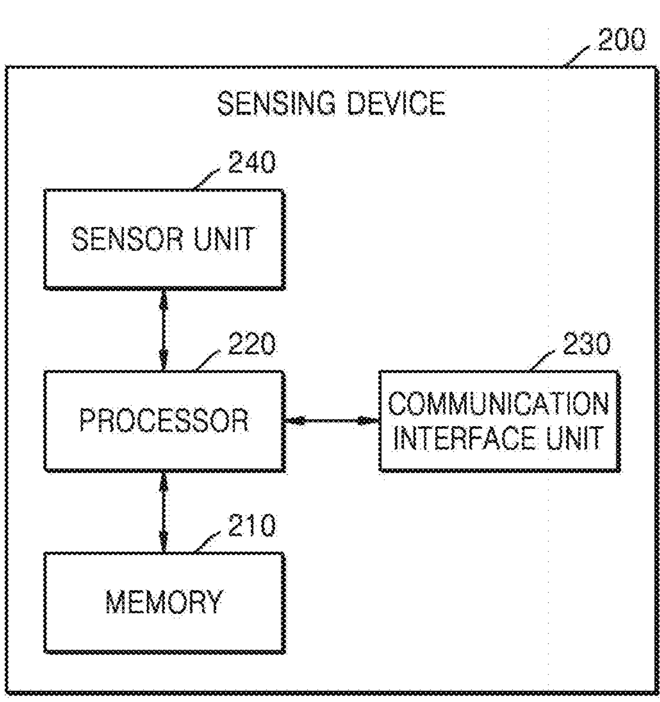
FIG. 3 is a diagram for describing a configuration and operation of a sensing device.

FIG. 3 is a diagram for describing a configuration and operation of the sensing device 200.

Referring to FIG. 3, the sensing device 200 according to an embodiment may include a memory 210, a processor 220, a communication interface unit 230, and a sensor unit 240. It is obvious to those of skill in the art that the sensing device 200 may further include other general-purpose components in addition to the components illustrated in FIG. 3.

The memory 210 may store software and/or programs. The memory 210 may store instructions executable by the processor 220.

The processor 220 may access and use data stored in the memory 210 or store new data in the memory 210. The processor 220 may execute the instructions stored in the memory 210. The processor 220 may execute a computer program installed in the sensing device 200. Also, the processor 220 may install, in the memory 210, a computer program or an application received from the outside. The processor 220 may include at least one processing module. For example, the processor 220 may include a processing module configured to execute a program for sensing a three-dimensional space. The processor 220 may control other components included in the sensing device 200 to perform an operation corresponding to a result of executing an instruction, a computer program, or the like.

The communication interface unit 230 may perform wired/wireless communication with other devices or networks. To this end, the communication interface unit 230 may include a communication module that supports at least one of various wired/wireless communication methods. For example, the communication interface unit 230 may include a communication module configured to perform short-distance communication, such as Wi-Fi, wireless communication, such as various types of mobile communication, or wired communication using a coaxial cable, an optical cable or the like. The communication interface unit 230 may be connected to the server 300 located outside the sensing device 200 to transmit and receive signals or data. The sensing device 200 may communicate with other sensing devices 200 through the communication interface unit 230, or may be connected to the server 300 that manages a zone in which the sensing device 200 is located.

The sensor unit 240 may include at least one sensor for sensing a three-dimensional space. The sensor unit 240 may detect an object located within a sensing range, and obtain data for generating coordinates of the detected object in a three-dimensional space. The sensor unit 240 may obtain shape data or distance data of an object located within the sensing range. The sensor unit 240 may include at least one of various types of sensors, such as a LIDAR sensor, a radar sensor, a camera sensor, an infrared image sensor, or an ultrasonic sensor.

For example, the sensor unit 240 may include at least one three-dimensional LIDAR sensor to obtain data regarding a space in a 360-degree range, and may further include at least one of a radar sensor and an ultrasonic sensor to obtain data regarding a nearby space within a certain distance from the sensing device 200.

The processor 220 may execute the instructions stored in the memory 210 to perform the following operations. According to an example, the processor 220 may obtain sensing data regarding a three-dimensional space by using at least one sensor. The processor 220 may transmit the obtained sensing data to the outside through the communication interface unit 230.

The processor 220 may transmit data or information obtained by processing the obtained sensing data, to the outside through the communication interface unit 230. The processor 220 may identify at least one object in the three-dimensional space by using an object classification model for the sensing data, and track the three-dimensional space including the identified at least one object. The processor 220 may transmit information related to the tracked space to the outside through the communication interface unit 230.

Figure 4:
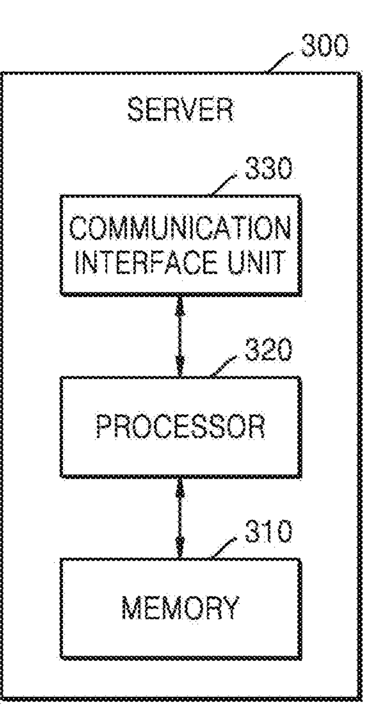
FIG. 4 is a diagram for describing a configuration and operation of a server.

FIG. 4 is a diagram for describing a configuration and operation of the server 300.

Referring to FIG. 4, the server 300 according to an embodiment may include a memory 310, a processor 320, and a communication interface unit 330. It is obvious to those of skill in the art that the server 300 may further include other general-purpose components in addition to the components illustrated in FIG. 4.

The memory 310 may store software and/or programs. The memory 310 may store instructions executable by the processor 320.

The processor 320 may use data stored in the memory 310 or store new data in the memory 310. The processor 320 may execute the instructions stored in the memory 310. The processor 320 may execute a computer program installed in the server 300. The processor 320 may include at least one processing module. For example, the processor 320 may include a processing module configured to establish a session for remote control with external devices or a processing module configured to execute a program for generating vehicle control information for remote control of the vehicle 100 by tracking a three-dimensional space, and may also include the processing modules implemented as separate dedicated chips. The processor 320 may control other components included in the server 300 to perform an operation corresponding to a result of executing instructions, a computer program, or the like.

The communication interface unit 330 may perform wired/wireless communication with other devices or networks. To this end, the communication interface unit 330 may include a communication module that supports at least one of various wired/wireless communication methods. For example, the communication interface unit 330 may include a communication module configured to perform short-distance communication, such as Wi-Fi, wireless communication, such as various types of mobile communication, or wired communication using a coaxial cable, an optical cable or the like. The communication interface unit 330 may be connected to devices located outside the server 300 to transmit and receive signals or data. The server 300 may communicate with the vehicle 100 or the sensing device 200 through the communication interface unit 330, or may be connected to another server 300 connected to a network.

The processor 320 may execute the instructions stored in the memory 310 to perform the following operations. According to an example, the processor 320 may establish a session for remote control of the vehicle 100 to be transported. The processor 320 may obtain vehicle information including identification information and location information of the vehicle 100 to be transported to a destination within a certain area. The processor 320 may obtain the vehicle information by receiving the vehicle information as request information for establishment of a session for remote control of the vehicle 100 to be transported, from the vehicle 100 to be transported or a terminal 500 of a manager of the server 300 through the communication interface unit 330. The processor 320 may register, in the server 300, the vehicle 100 to be transported, by using the obtained vehicle information, and establish a communication between the server 300 and the vehicle 100 to be transported, through the communication interface unit 330.

The processor 320 may receive sensing data from a plurality of sensing devices 200 installed in a certain area through the communication interface unit 330. The processor 320 may receive sensing data from the sensing devices 200 corresponding to a moving path from a starting point to a destination, among the plurality of sensing devices 200 installed in the certain area, through the communication interface unit 330. The processor 320 may identify the moving path of the vehicle 100 to be transported from the starting point to the destination, request sensing data from the sensing devices 200 located within certain distances from the moving path, and receive the sensing data from the sensing devices 200 scanning spaces on the moving path. This is to prevent the sensing devices 200 that are far from the moving path from operating, reduce the amount of sensing data received by the server 300, and thus reduce the amount of computation for spatial tracking by the server 300.

The processor 320 may track spaces corresponding to the certain area based on the received sensing data. The processor 320 may track spaces corresponding to a certain zone based on the sensing data obtained by scanning a three-dimensional space corresponding to the location of each of the plurality of sensing devices 200. The processor 320 may track the spaces corresponding to the certain area by reconstructing the spaces tracked by using the respective sensing devices 200.

For example, in a case in which the server 300 receives sensing data in the form of point cloud data from the sensing device 200 including a LIDAR sensor, the processor 320 may extract object areas from the received point cloud data, cluster the object areas, and thus classify the individual object areas. The processor 320 may identify an object from the received point cloud data by using an object classification model, and obtain information related to the identified object. The processor 320 may track the spaces corresponding to the certain zone by using object-related information obtained based on the individual object areas and the information related to the identified object. The processor 320 may identify static objects, such as the ground, a building, or an infrastructure, or dynamic objects, such as the vehicle 100 or other transportation vehicles, by applying point cloud data regarding a three-dimensional space to an object classification model or by clustering the point cloud data regarding the three-dimensional space.

As another example, in a case in which the server 300 receives image data from the sensing device 200 including a camera sensor, the processor 320 may track spaces corresponding to a certain zone by performing, on the received image data, a reconstruction process for generating a three-dimensional vector space. The processor 320 may identify an object in the tracked space or distinguish between static objects and dynamic objects by using an image object classification model.

The processor 320 may track the spaces corresponding to the certain area by detecting static objects and dynamic objects by using pre-stored map information and the received sensing data regarding the certain area, and predicting movements of the detected dynamic objects. The processor 320 may determine attribute information about at least one of the type, shape, location, size, movement trajectory, and speed of at least one object identified in the tracked space, to track the space corresponding to the certain area. An object in the tracked space may have a value corresponding to certain coordinates based on the fixed location of the sensing device 200, and may be mapped to the location of a corresponding part of an absolute coordinate system.

The processor 320 may obtain vehicle control information according to the location of the vehicle 100 to be transported, based on object information related to an object in the tracked space and the vehicle information about the vehicle 100 to be transported. The processor 320 may obtain the vehicle control information based on the object information about an object within a predetermined distance from the real-time location of the vehicle 100 to be transported on the moving path from the starting point to the destination. The distance between the location of the vehicle 100 and the location of the object is a measure of the responsiveness of the vehicle 100 to the object, and its value may be set in a program for generating vehicle control information.

According to an example, the processor 320 may obtain pre-programmed first vehicle control information corresponding to the moving path of the vehicle 100. The processor 320 may obtain, as the vehicle control information, second vehicle control information obtained by correcting the first vehicle control information according to object information about an object with a predetermined distance from the real-time location of the vehicle 100 to be transported. For example, in a case in which there are no or a few external factors interfering with the transport of the vehicle 100, such as when the moving path is not on a general road or is on a dedicated road for transporting the vehicle 100, vehicle control information may be pre-programmed in correspondence with the moving path. In such a case, the pre-programmed first vehicle control information may be used the vehicle control information, but when there is an object approaching the real-time location of the vehicle 100 within a preset distance, the second vehicle control information, which is a result of correcting the first vehicle control information, may be used as the vehicle control information.

According to another example, when an unexpected situation occurs in the tracked space, the processor 320 may obtain first vehicle control information corresponding to a countermeasure manual. The processor 320 may obtain, as the vehicle control information, the second vehicle control information obtained by correcting the first vehicle control information according to object information about an object within a predetermined distance from the real-time location of the vehicle 100 to be transported. For example, when the transport of the vehicle 100 is restricted due to an issue on the vehicle 100, the sensing device 200, or the road, first vehicle control information corresponding to a countermeasure manual for the issue may be used as the vehicle control information, but when there is an object approaching the real-time location of the vehicle 100 within a preset distance, second vehicle control information, which is a result of correcting the first vehicle control information, may be used as the vehicle control information.

Meanwhile, in a case in which a certain area is divided into a plurality of zones and the server 300 is provided in each zone for managing the zone, the server 300 may share object information about an object with another server 300 in an adjacent zone. For example, the processor 320 may receive, from another server 300 managing a second zone adjacent to a first zone managed by the server 300 in the certain area, object information about a dynamic object moving from the second zone to the first zone, and may transmit, to the other server 300, object information about a dynamic object moving from the first zone to the second zone. The server 300 may utilize the object information about the dynamic object received from the other server 300, for remote control of the vehicle 100 to be transported. For example, when a dynamic object moving at a very high speed from the second zone toward the first zone is detected, the server 300 in the first zone may receive object information about the dynamic object in advance from the server 300 in the second zone, and reflect the object information on the dynamic object when generating vehicle control information so as to prevent the occurrence of a collision accident between the vehicle 100 and the dynamic object.

The processor 320 may transmit the obtained vehicle control information to the vehicle 100 to be transported, through the communication interface unit 330. In a case in which there are a plurality of vehicles 100 to be transported, the processor 320 may identify vehicle control information corresponding to identification information of each vehicle 100, and transmit the identified vehicle control information to each vehicle 100 corresponding to the identification information.

Figure 5:
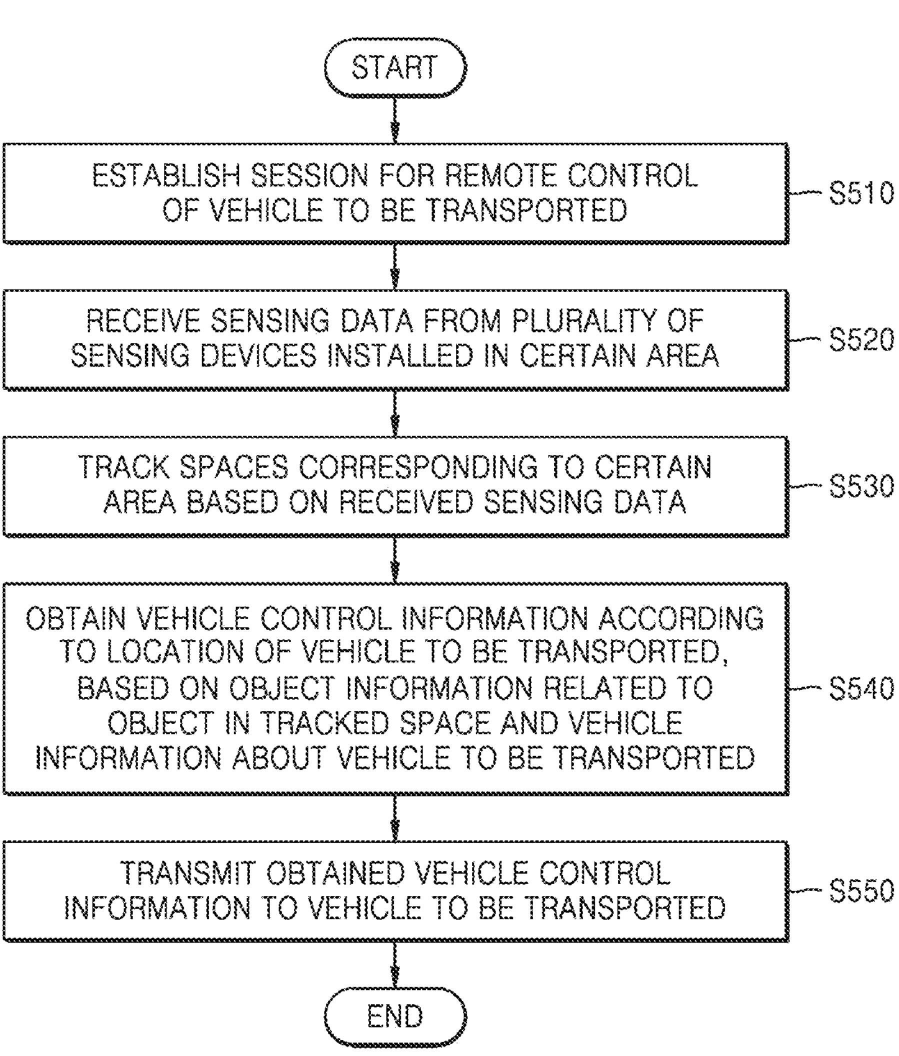
FIG. 5 is a flowchart for describing a method of remotely controlling a vehicle.

FIG. 5 is a flowchart for describing a method of remotely controlling the vehicle 100.

In S510, the server 300 establishes a session for remote control of the vehicle 100 to be transported. The server 300 may obtain vehicle information including identification information and location information of the vehicle 100 to be transported to a destination within a certain area. The server 300 may obtain the vehicle information by receiving the vehicle information from the vehicle 100 to be transported or the terminal 500 of the manager of the server 300, as request information for establishment of the session for remote control of the vehicle 100 to be transported. The server 300 may register, in the server 300, the vehicle 100 to be transported, by using the obtained vehicle information, and establish a communication between the server 300 and the vehicle 100 to be transported.

In S520, the server 300 receives sensing data from the plurality of sensing devices 200 installed in the certain area. The server 300 may receive the sensing data from the sensing devices 200 corresponding to a moving path from a starting point to a destination, among the plurality of sensing devices 200 installed in the certain area. The server 300 may identify the moving path of the vehicle 100 to be transported from the starting point to the destination, request sensing data from the sensing devices 200 located within certain distances from the moving path, and receive the sensing data from the sensing devices 200 scanning spaces on the moving path.

In S530, the server 300 tracks spaces corresponding to the certain area based on the received sensing data. The server 300 may track spaces corresponding to a certain zone based on the sensing data obtained by scanning a three-dimensional space corresponding to the location of each of the plurality of sensing devices 200. The server 300 may track the spaces corresponding to the certain area by reconstructing the spaces tracked by using the respective sensing devices 200. The server 300 may track the spaces corresponding to the certain area by detecting static objects and dynamic objects by using pre-stored map information and the received sensing data regarding the certain area, and predicting movements of the detected dynamic objects.

The server 300 may receive, from another server 300 managing a second zone adjacent to a first zone managed by the server 300 in the certain area, object information about a dynamic object moving from the second zone to the first zone. In addition, the server 300 may transmit, to the other server 300 managing the second zone adjacent to the first zone managed by the server 300 in the certain area, object information about a dynamic object moving from the first zone to the second zone. The server 300 may utilize the object information about the dynamic object received from the other server 300, for remote control of the vehicle 100 to be transported.

In S540, the server 300 obtains vehicle control information according to the location of the vehicle 100 to be transported, based on object information related to an object in the tracked space and the vehicle information about the vehicle 100 to be transported. The server 300 may obtain the vehicle control information based on the object information about an object within a predetermined distance from the real-time location of the vehicle 100 to be transported on the moving path from the starting point to the destination.

According to an example, the server 300 may obtain pre-programmed first vehicle control information corresponding to the moving path of the vehicle 100. The server 300 may obtain, as the vehicle control information, second vehicle control information obtained by correcting the first vehicle control information according to object information about an object within a predetermined distance from the real-time location of the vehicle 100 to be transported. According to another example, when an unexpected situation occurs in the tracked space, the server 300 may obtain first vehicle control information corresponding to a countermeasure manual. The server 300 may obtain, as the vehicle control information, second vehicle control information obtained by correcting the first vehicle control information according to object information about an object within a predetermined distance from the real-time location of the vehicle 100 to be transported.

In S550, the server 300 transmits the obtained vehicle control information to the vehicle 100 to be transported. In a case in which there are a plurality of vehicles 100 to be transported, the server 300 may identify vehicle control information corresponding to identification information of each vehicle 100, and transmit the identified vehicle control information to the vehicle 100 corresponding to the identification information.

Figure 6:
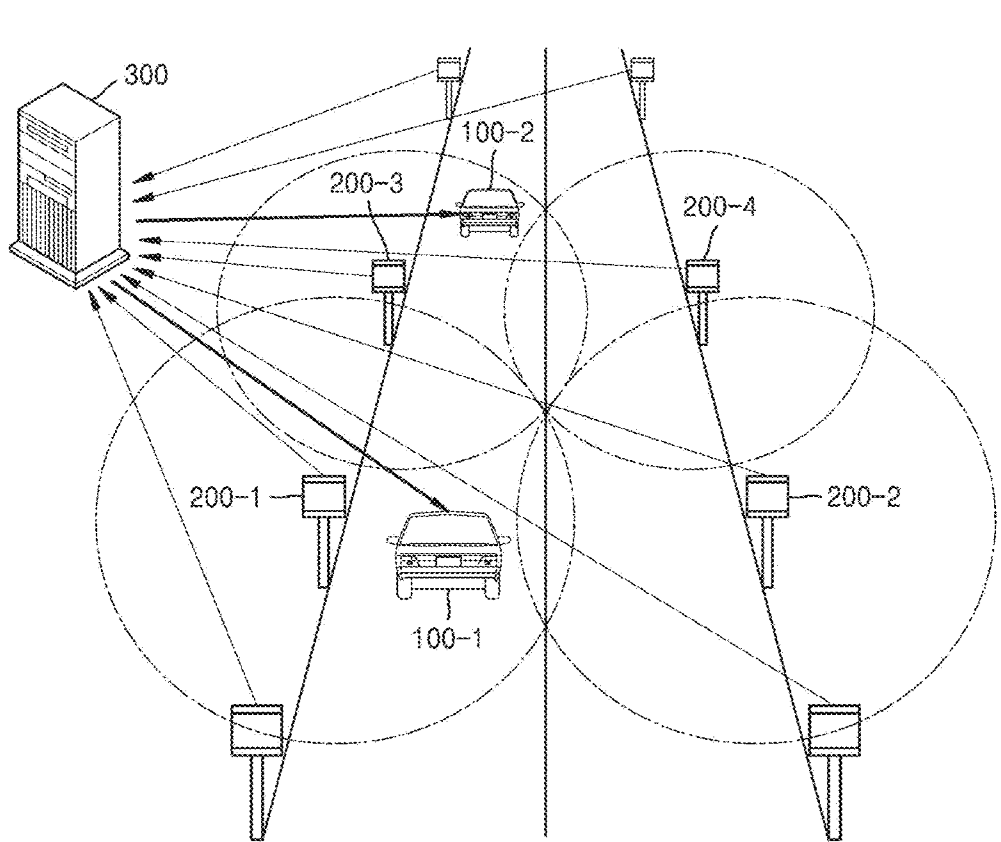
FIG. 6 is a diagram illustrating an example in which a server remotely controls vehicles.

FIG. 6 is a diagram illustrating an example in which the server 300 remotely controls vehicles 100-1 and 100-2.

Referring to FIG. 6, a plurality of sensing devices 200-1, 200-2, 200-3, and 200-4 are installed on a moving path of the vehicles 100-1 and 100-2 to be transported. The sensing devices 200-1, 200-2, 200-3, and 200-4 have certain sensing ranges, respectively, and are arranged at appropriate intervals such that there are no unscanned blind spots on the moving path.

The server 300 may receive sensing data from the plurality of sensing devices 200-1, 200-2, 200-3, and 200-4. Referring to FIG. 6, the first sensing device 200-1 may transmit, to the server 300, sensing data corresponding to a sensing range where the first vehicle 100-1 moving along the moving path is located. The third sensing device 200-3 may transmit, to the server 300, sensing data corresponding to a sensing range where the second vehicle 100-2 moving along the moving path is located.

The server 300 tracks spaces corresponding to a certain area based on the sensing data received from the plurality of sensing devices 200-1, 200-2, 200-3, and 200-4. Based on the sensing data obtained by scanning a three-dimensional space corresponding to the location of each of the plurality of sensing devices 200-1, 200-2, 200-3, and 200-4, the server 300 may track spaces corresponding to a certain zone, reconstruct the tracked spaces, and thus track the spaces corresponding to the certain area.

The server 300 may check whether there is an object that may be an obstacle in the transport of the vehicles 100-1 and 100-2, based on the location of each of the vehicles 100-1 and 100-2 to be transported. For example, based on the real-time location of the first vehicle 100-1, the server 300 may check the shape of the road, a lane, and the like on the moving path, and check whether there is an object that may collide with the first vehicle 100-1. Based on the real-time location of the second vehicle 100-2, the server 300 may check the distance from the first vehicle 100-1 such that at least a certain distance from the front vehicle 100-1 is maintained.

The server 300 obtains vehicle control information according to the locations of the vehicles 100-1 and 100-2 to be transported, based on real-time location information of the vehicles 100-1 and 100-2 to be transported and object information related to objects in the tracked spaces. The server 300 may identify vehicle control information corresponding to identification information of each of the vehicles 100-1 and 100-2 to be transported, and transmit the identified vehicle control information to each of the vehicles 100-1 and 100-2 to be transported.

Figure 7:
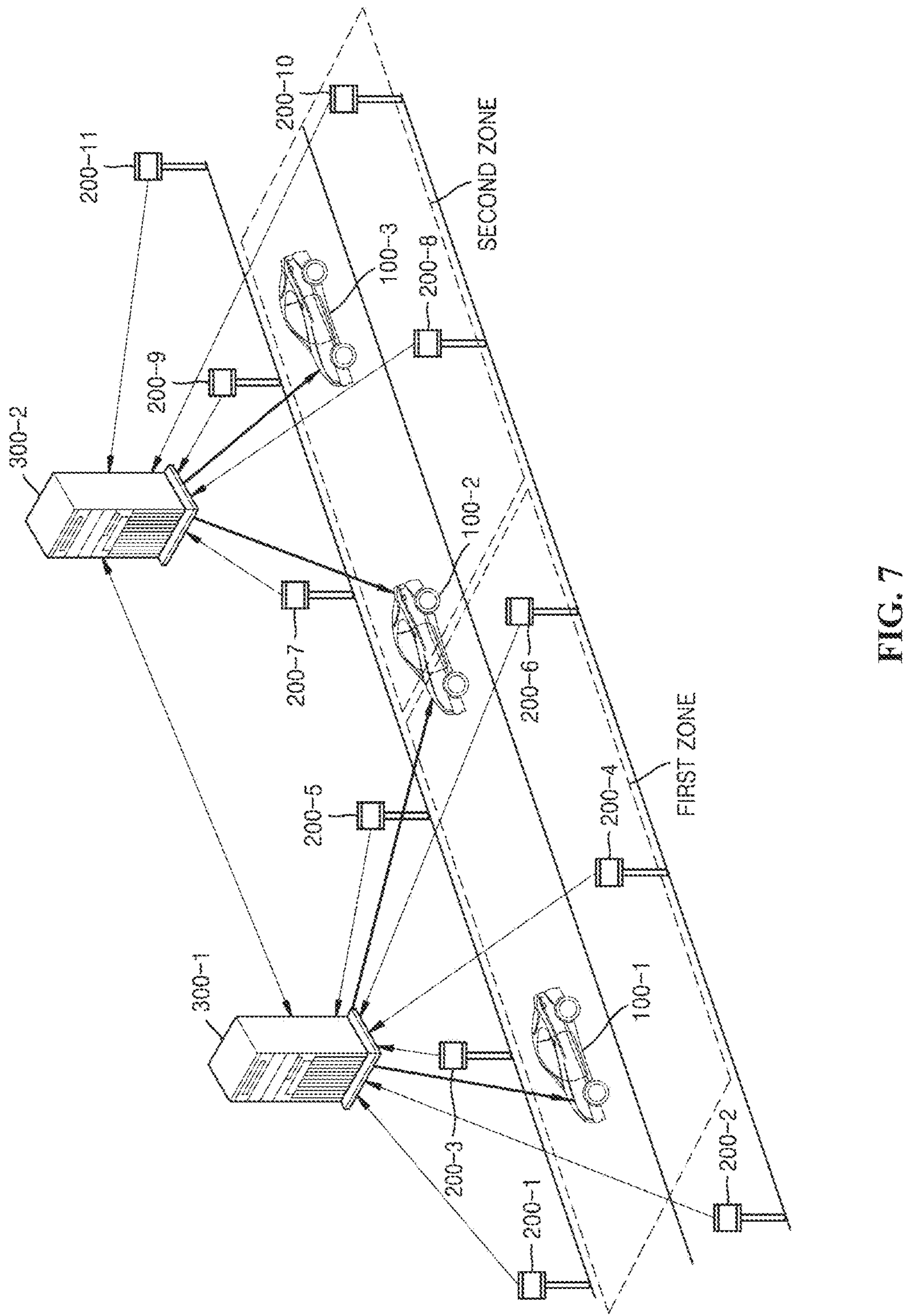
FIG. 7 is a diagram illustrating an example in which servers remotely control vehicles.

FIG. 7 is a diagram illustrating an example in which servers 300-1 and 300-2 remotely control vehicles 100-1, 100-2 and 100-3.

Referring to FIG. 7, it may be seen that a plurality of servers 300-1 and 300-2 are used to track spaces corresponding to a certain area. The plurality of servers 300-1 and 300-2 may track spaces corresponding to respective allocated zones, and transmit vehicle control information to the vehicles 100-1, 100-2 and 100-3 within the respective zones.

The first server 300-1 may receive sensing data from the first sensing device 200-1 to a sixth sensing device 200-6 in order to track spaces corresponding to a first zone. In this case, each of the first sensing device 200-1 to the sixth sensing device 200-6 may transmit, to the first server 300-1, the sensing data together with identification information of the sensing device 200. Based on the identification information of the sensing device 200 received together with the sensing data, the first server 300-1 may obtain the sensing data corresponding to the location of each of the first sensing device 200-1 to the sixth sensing device 200-6, and track the spaces corresponding to the first zone. The first server 300-1 may obtain vehicle control information according to the respective locations of the first vehicle 100-1 and the second vehicle 100-2 that is entering the first zone, and transmit the vehicle control information to each of the first vehicle 100-1 and the second vehicle 100-2.

The second server 300-1 may receive sensing data from a seventh sensing device 200-7 to an eleventh sensing device 200-11 in order to track spaces corresponding to a second zone. In this case, each of the seventh sensing device 200-7 to the eleventh sensing device 200-11 may transmit, to the second server 300-2, the sensing data together with identification information of the sensing device 200. Based on the identification information of the sensing device 200 received together with the sensing data, the second server 300-2 may obtain the sensing data corresponding to the location of each of the seventh sensing device 200-7 to the eleventh sensing device 200-11, and track the spaces corresponding to the second zone. The second server 300-2 may obtain vehicle control information according to the respective locations of the third vehicle 100-3 and the second vehicle 100-2 that is leaving the second zone, and transmit the vehicle control information to each of the second vehicle 100-2 and the third vehicle 100-3.

The first server 300-1 may receive, from the second server 300-2 managing the second zone adjacent to the first zone managed by the first server 300-1 in the certain area, object information about a dynamic object moving from the second zone to the first zone. In addition, the first server 300-1 may transmit, to the second server 300-2 managing the second zone adjacent to the first zone managed by the first server 300-1 in the certain area, object information about a dynamic object moving from the first zone to the second zone. The first server 300-1 may utilize the object information about the dynamic object received from the second server 300-2 for remote control of the first vehicle 100-1 and the second vehicle 100-2, and the second server 300-2 may utilize the object information about the dynamic object received from the first server 300-1 for remote control of the second vehicle 100-2 and the third vehicle 100-3.

Figure 8:
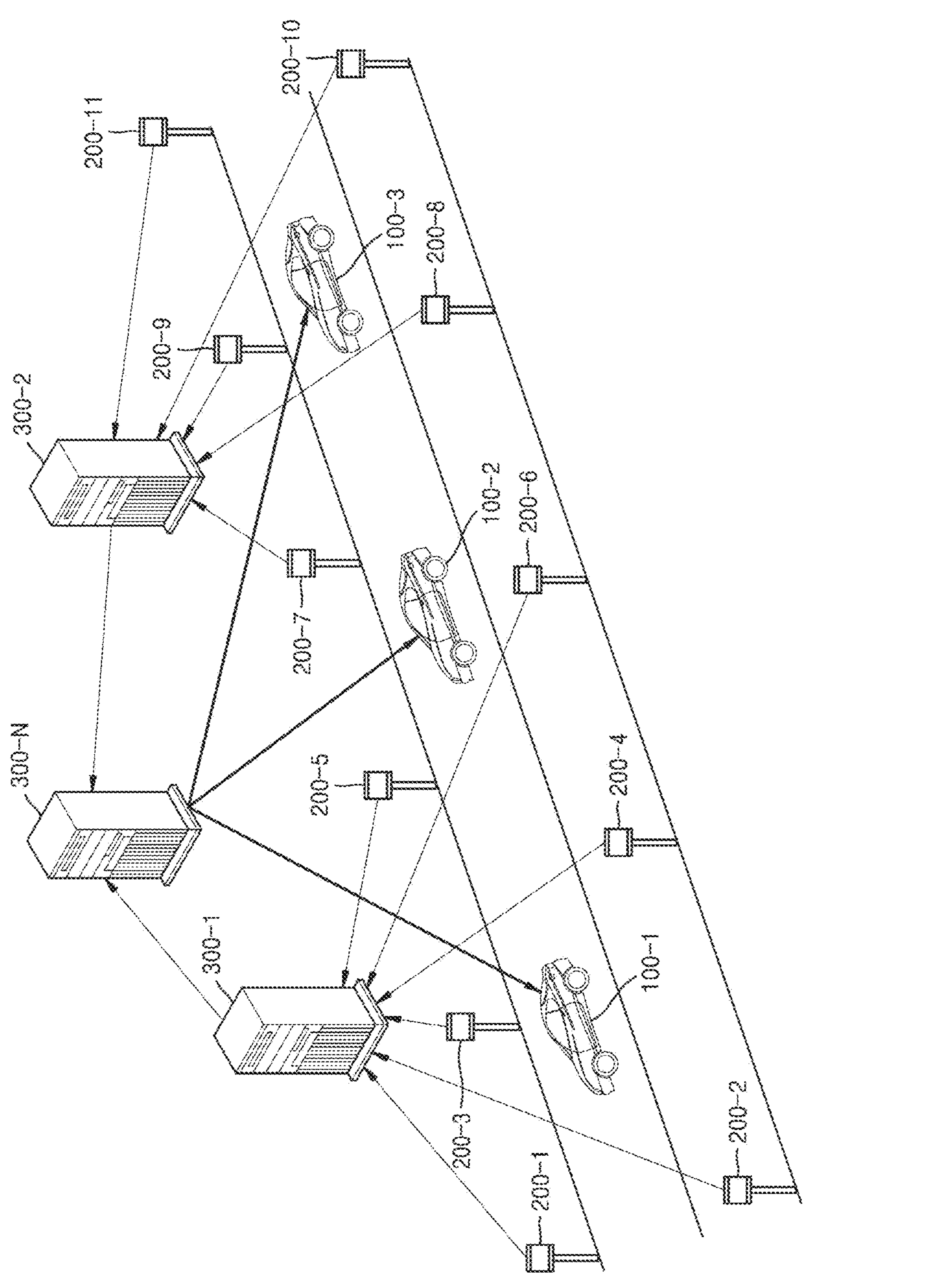
FIG. 8 is a diagram illustrating an example in which servers having a hierarchical structure remotely control vehicles.

FIG. 8 is a diagram illustrating an example in which servers 300-1, 300-2, and 300-N having a hierarchical structure remotely control the vehicles 100-1, 100-2, and 100-3.

Referring to FIG. 8, it may be seen that a plurality of servers 300-1, 300-2, and 300-N are used to track spaces corresponding to a certain area. The plurality of servers 300-1, 300-2, and 300-N may track the spaces corresponding to the certain area, and transmit vehicle control information to the vehicles 100-1, 100-2, and 100-3.

As illustrated in FIG. 8, the plurality of servers 300-1, 300-2, and 300-N may have a hierarchical structure therebetween in order to track the spaces corresponding to the certain area. Sensing data collected by the lower-layer servers 300-1 and 300-2 may be transmitted to the upper-layer server 300-N and then incorporated into information about the spaces corresponding to the certain area. The upper-layer server 300-N may obtain vehicle control information according to the location of each of the vehicles 100-1, 100-2, and 100-3 to be transported, based on object information related to objects in the tracked spaces, and vehicle information of each of the vehicles 100-1, 100-2, and 100-3 to be transported. The upper-layer server 300-N may obtain vehicle control information according to the location of each of the vehicles 100-1, 100-2, and 100-3 to be transported, and transmit the vehicle control information to each of the vehicles 100-1, 100-2, and 100-3 to be transported.

Meanwhile, the upper-layer server 300-N may be connected to an external server or a traffic control system server that provides road information or traffic information, and thus generate the vehicle control information further based on information transmitted and received to and from the external server or traffic control system server. For example, the upper-layer server 300-N may receive, from an external server that provides traffic information, information about a point where a traffic accident has occurred, and set a detour path such that the vehicles 100-1, 100-2, and 100-3 to be transported do not move toward the point of the traffic accident. The upper-layer server 300-N may receive sensing data from the sensing devices 200 on the detour path, and track spaces corresponding to the detour path based on the received sensing data. The upper-layer server 300-N may obtain the vehicle control information according to the locations of the vehicles 100-1, 100-2, and 100-3 to be transported, based on the object information related to the objects in the tracked spaces and the vehicle information about the vehicles 100-1, 100-2, and 100-3 to be transported, and transmit the obtained vehicle control information to each of the vehicles 100-1, 100-2, and 100-3 to be transported.

Each of the above-described embodiments may be provided in the form of a computer program or an application stored in a computer-readable storage medium, in order for a device for remotely controlling the vehicle 100 to perform a method of remotely controlling the vehicle 100 including predefined operations. In other words, each of the above-described embodiments may be provided in the form of a computer program or an application stored in a computer-readable storage medium, to cause a device for remotely controlling the vehicle 100 to perform a method of remotely controlling the vehicle 100 including predefined operations.

The above-described embodiments may be implemented in the form of a computer-readable storage medium storing instructions executable by a computer or a processor, and data. At least one of the instructions and the data may be stored in the form of program code, and when executed by a processor, a certain program module may be generated to perform a certain operation. Such computer-readable storage media may include read only memory (ROM), random access memory (RAM), flash memory, compact disc ROMs (CD-ROMs), CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing instructions or software, associated data, data files, and data structures, and providing the instructions or software, associated data, data files, and data structures to a processor or a computer such that the processor or computer may execute the instructions.

The embodiments have been described above. It will be understood by those of skill in the art to which the embodiments disclosed herein belong that the present disclosure may be implemented in a modified form without departing from the intrinsic characteristics of the embodiments. Therefore, the disclosed embodiments are to be considered in a descriptive sense only, and not for purposes of limitation. The scope of the present disclosure is in the claims rather than the descriptions of the embodiments, and all differences within the equivalent scope should be construed as being included in the scope of the present disclosure.

What is claimed is:

1. A server for remotely controlling a vehicle, the server comprising:

a communication interface unit;

a memory storing instructions; and a processor configured to execute the instructions to:

establish a session for remote control of the vehicle to be transported, receive, through the communication interface unit, sensing data from a plurality of sensing devices installed in a certain area, track spaces corresponding to the certain area, based on the received sensing data, obtain vehicle control information according to a location of the vehicle to be transported, based on object information related to objects in the tracked spaces and vehicle information about the vehicle to be transported, by:

obtaining pre-programmed first vehicle control information corresponding to a moving path from a starting point to a destination, and obtaining, as the vehicle control information, second vehicle control information obtained by correcting the first vehicle control information according to object information about an object within a predetermined distance from a real-time location of the vehicle to be transported on the moving path, transmit, through the communication interface unit, the obtained vehicle control information to the vehicle to be transported, wherein the vehicle control information includes one or more control commands for controlling at least one of a steering device, an acceleration device, or a deceleration device of the vehicle to be transported, and remotely control the vehicle to be transported on the moving path based on the one or more control commands.

2. The server of claim 1, wherein the processor is further configured to execute the instructions to, upon occurrence of an unexpected situation in the tracked space, obtain the first vehicle control information corresponding to a countermeasure manual.

3. The server of claim 1, wherein the processor is further configured to execute the instructions to track the spaces by detecting a static object and a dynamic object by using pre-stored map information regarding the certain area and the received sensing data and predicting a movement of the detected dynamic object.

4. The server of claim 3, wherein the processor is further configured to execute the instructions to receive, from another server managing a second zone adjacent to a first zone managed by the server in the certain area, object information about a dynamic object moving from the second zone to the first zone, and transmit, to the other server, object information about a dynamic object moving from the first zone to the second zone, through the communication interface unit.

5. The server of claim 1, wherein the processor is further configured to execute the instructions to obtain vehicle information including identification information and location information of the vehicle to be transported to the destination within the certain area, register the vehicle to be transported, in the server by using the vehicle information, and establish, through the communication interface unit, a communication between the server and the vehicle to be transported.

6. The server of claim 5, wherein the processor is further configured to execute the instructions to obtain the vehicle information by receiving, from the vehicle to be transported or a terminal of a manager of the server through the communication interface unit, the vehicle information as request information for establishment of the session.

7. The server of claim 1, wherein the processor is further configured to execute the instructions to, in response to a plurality of vehicles to be transported, obtain vehicle control information corresponding to identification information of each vehicle, and transmit the obtained vehicle control information to each vehicle corresponding to the identification information through the communication interface unit.

8. A method, performed by a server, of remotely controlling a vehicle, the method comprising:

establishing a session for remote control of a vehicle to be transported;

receiving sensing data from a plurality of sensing devices installed in a certain area;

tracking spaces corresponding to the certain area, based on the received sensing data;

obtaining vehicle control information according to a location of the vehicle to be transported, based on object information related to objects in the tracked spaces and vehicle information about the vehicle to be transported, wherein the obtaining comprises:

obtaining pre-programmed first vehicle control information corresponding to a moving path from a starting point to a destination, and obtaining, as the vehicle control information, second vehicle control information obtained by correcting the first vehicle control information according to object information about an object within a predetermined distance from a real-time location of the vehicle to be transported on the moving path;

transmitting the obtained vehicle control information to the vehicle to be transported, wherein the vehicle control information includes one or more control commands for controlling at least one of a steering device, an acceleration device, or a deceleration device of the vehicle to be transported; and remotely controlling the vehicle to be transported on the moving path based on the one or more control commands.

9. The method of claim 8, wherein obtaining the vehicle control information comprises:

upon occurrence of an unexpected situation in the tracked space, obtaining the first vehicle control information corresponding to a countermeasure manual.

10. The method of claim 8, wherein tracking the spaces comprises:

detecting a static object and a dynamic object by using pre-stored map information regarding the certain area and the received sensing data; and predicting a movement of the detected dynamic object.

11. The method of claim 10, wherein tracking the spaces further comprises receiving, from another server managing a second zone adjacent to a first zone managed by the server in the certain area, object information about a dynamic object moving from the second zone to the first zone.

12. The method of claim 8, wherein establishing the session comprises:

obtaining vehicle information including identification information and location information of the vehicle to be transported to the destination within the certain area;

registering, in the server, the vehicle to be transported by using the vehicle information; and establishing a communication between the server and the vehicle to be transported.

13. The method of claim 12, wherein obtaining the vehicle information comprises obtaining the vehicle information by receiving, from the vehicle to be transported or a terminal of a manager of the server, the vehicle information as request information for establishment of the session.

14. A non-transitory computer readable recording medium storing instructions, when executed by one or more processors, that cause the one or more processors to perform the method of claim 1.

15. The method of claim 8, wherein at least one of the plurality of sensing devices comprises a light detection and ranging (LIDAR) sensor and the sensing data includes point cloud data, and wherein tracking the spaces comprises:

extracting object areas from the received point cloud data, clustering the object areas to classify individual object areas, and identifying at least one object from the received point cloud by using an object classification model.

16. The method of claim 8, wherein at least one of the plurality of sensing devices comprises a camera sensor and the sensing data includes image data, and wherein tracking the spaces comprises:

performing, on the received image data, a reconstruction process for generating a three-dimensional vector space, and identifying at least one object in the tracked space or distinguishing between static objects and dynamic objects by using an image object classification model, thereby obtaining the object information used to obtain the vehicle control information.

17. The method of claim 8, wherein remotely controlling the vehicle comprises causing the vehicle to actuate at least one of the steering device, the acceleration device, or the deceleration device based on the transmitted vehicle control information.

18. The method of claim 8, wherein the vehicle control information is generated and transmitted to dynamically control movement of the vehicle along the moving path in response to changes in object information within the predetermined distance from the real-time location of the vehicle.

* * * * *